Feb. 24, 1942.  A. T. GORMAN  2,273,953
BRAKE SYSTEM CHARGING MEANS
Filed March 28, 1940
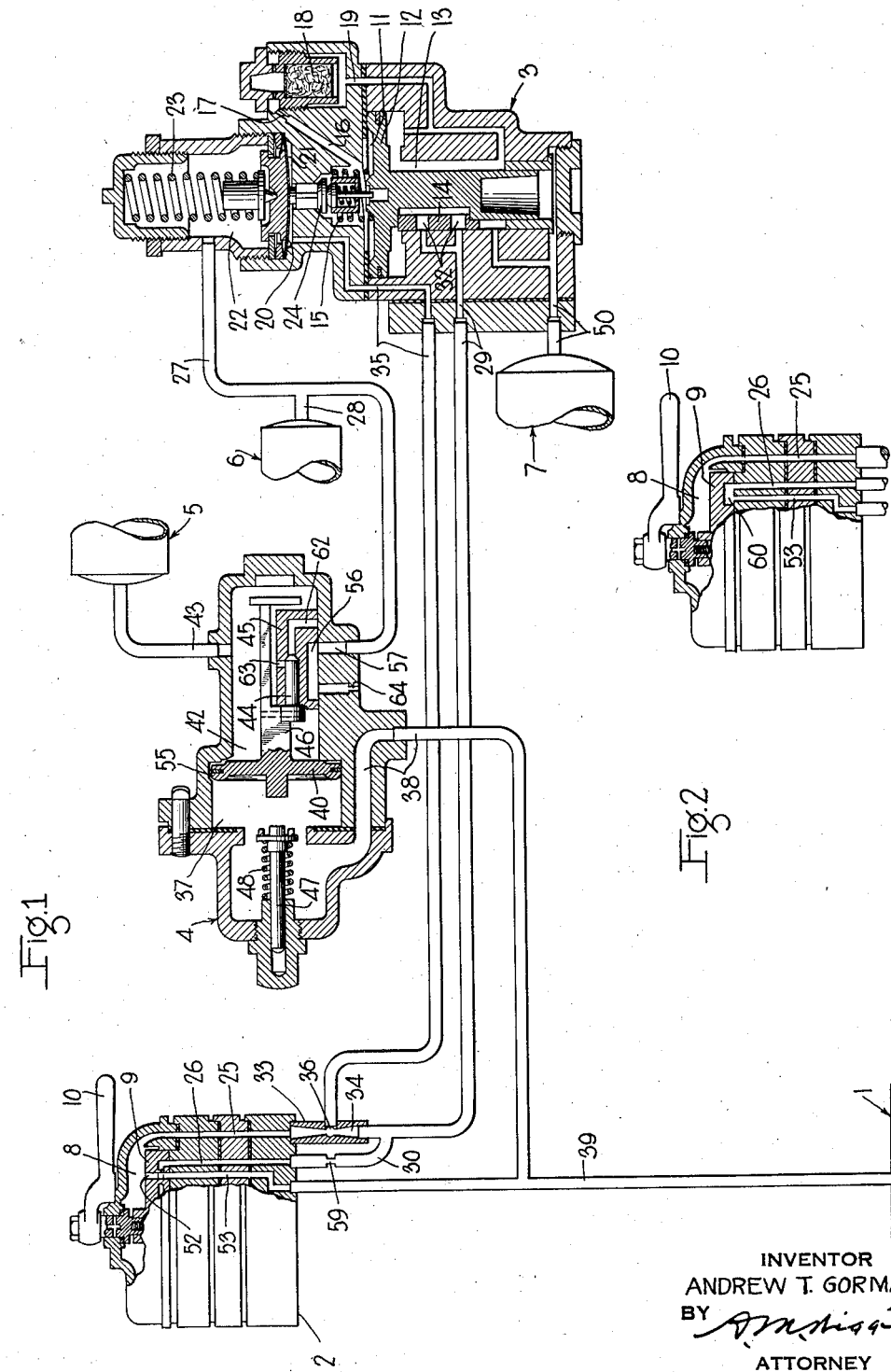
INVENTOR
ANDREW T. GORMAN
BY
ATTORNEY Patented Feb. 24, 1942

2,273,953

UNITED STATES PATENT OFFICE 2,273,953

BRAKE SYSTEM CHARGING MEANS

Andrew T. Gorman, Pitcairn, Pa., assignor to The Westinghouse Air Brake Company, Wilmerding, Pa., a corporation of Pennsylvania Application March 28, 1940, Serial No. 326,350

24 Claims. (Cl. 303—59)

This invention relates to locomotive fluid pressure brake equipment for controlling the application and release of the brakes on a train of cars, and more particularly to means for controlling the charging and recharging of the equipment.

The usual type of locomotive brake equipment comprises a main storage volume, such for instance as one or more main reservoirs, a brake pipe, a feed valve device, a brake controlling valve device and an engineer's automatic brake valve device.

The engineer's brake valve device is provided with a release position in which the main storage volume, containing fluid under pressure at higher than normal brake pipe pressure, is directly connected to the brake pipe. The brake valve device is also provided with a running position, in which fluid under pressure is supplied from the main reservoir to the brake pipe through the feed valve device, the setting of the feed valve device determining the normal brake pipe pressure. In initially charging, and in recharging the equipment to effect the release of the brakes, it is customary to first move the engineer's brake valve to release position, in which fluid under pressure is supplied directly from the main reservoir to the brake pipe and then, after a desired predetermined interval of time has elapsed, the brake valve is moved to running position, in which fluid at feed valve pressure is supplied to the brake pipe.

The initial supply of fluid at high pressure to the brake pipe rapidly increases the brake pipe pressure on the cars at the front end of the train. This high head of pressure at the front end of the train is adapted to cause a rapid flow of fluid under pressure toward the rear of the train so as to accelerate the release of the brakes and the charging of the brake equipment on the cars at the rear end of the train. However, the increased pressure in the brake pipe at the front end of the train is partially absorbed by the flow of air to the auxiliary reservoirs on the front cars.

In order to avoid the danger of overcharging the several control chambers and reservoirs on the cars at the front end of the train it is the usual practice to permit the brake valve to remain in release position for a period of time proportional to the amount the brake pipe pressure has been reduced in effecting an application of the brakes, that is to say for each pound the brake pipe pressure has been reduced. The maximum length of time that the brake valve device will remain in release position at any one time being in the neighborhood of fifteen seconds.

Therefore, the engineer must exercise considerable caution, for if the handle of the brake valve device is permitted to remain in release position for too long an interval of time before moving it to running position, the equipment, and particularly the auxiliary reservoirs on the cars at the front end of the train, are liable to be overcharged, that is, charged to a pressure above the pressure normally carried in the brake pipe. Now, when the brake valve handle is returned to running position the pressure of fluid supplied to the brake pipe will drop from the pressure carried in the main reservoir to the pressure setting of the feed valve device. This change in pressure is due to the equalization of pressure from the front to the rear of the train and may be at such a fast rate as to cause the brakes at the front end of the train to apply when in fact it is desired to release them.

The principal object of the present invention is to provide a locomotive brake equipment of the above mentioned type with means whereby the danger of objectional overcharge of the equipment is eliminated.

Another object of the invention is to provide a brake equipment of the above mentioned type with means operative in recharging the equipment to provide a supply of fluid to the brake pipe at a pressure in excess of the pressure normally carried in the brake pipe which excess pressure is proportional to the brake pipe reduction previously made.

Still another object of the invention is to provide means automatically operative to control the supply to the brake pipe of fluid at a pressure in excess of that normally carried and to gradually reduce the supply pressure to that normally carried in the brake pipe as brake pipe pressure in reducing by flow toward the rear of a train approaches that normally carried.

Other objects and advantages will appear in the following more detailed description of the invention.

In the accompanying drawing:

Fig. 1 is a diagrammatic view mainly in section of a portion of a fluid pressure brake apparatus embodying the invention, the brake valve device and several other parts of the apparatus being shown in release position.

Fig. 2 is a diagrammatic view mainly in section showing the brake valve device and connections established thereby when in running position.

As shown in Fig. 1 of the drawing, the equipment may comprise a brake pipe 1, an engineer's automatic brake valve device 2, a feed valve device 3, a control valve device 4 for controlling the operation of the feed valve device, a supply reservoir 5, a timing reservoir 6 and a main reservoir 7. It will, however, be understood that the equipment also comprises the usual parts which are responsive to variations in brake pipe pressure to effect the application and release of the brakes, but since these parts form no part of the invention and are not necessary to a clear understanding of the invention they have been omitted from the drawing and specification.

Considering now more in detail the devices referred to above, the automatic brake valve device 2 may be of the usual construction comprising a casing having a chamber 8 therein in which is mounted a rotary valve 9 operated by means of a handle 10.

The feed valve device 3 may be somewhat similar in construction to that of the usual feed valve device and is preferably of large capacity and of the remote control type. This device may comprise a casing having a piston chamber 11 containing a piston 12 and also having a valve chamber 13, in which is disposed a slide valve 14 which is adapted to be operated by the piston 12. The piston 12 is subject on one side to pressure of fluid in chamber 13 and on the other side to pressure of fluid in chamber 11 and to pressure of a spring 15. Chambers 11 and 13 are in communication with each other by way of passage 16, a restriction 17, strainer 18 and passage 19.

The regulating portion of the feed valve device may comprise a flexible diaphragm 20 which is interposed between a chamber 21 and a chamber 22 formed in the casing. The diaphragm 20 is subject on one side to the pressure of fluid in chamber 22 and the pressure of an adjustable coil spring 23 and adapted to control the operation of a valve 24 interposed between the piston chamber 11 and the chamber 21 which valve is operative to control communication between the chambers 11 and 21.

A feed valve supply pipe and passage 29 leads from the seat of the slide valve 14 to the usual main reservoir passage 25 in the brake valve device 2 and has a branch 30 which leads to the usual feed valve passage 26 in the brake valve device.

The slide valve 14 is provided with large capacity ports 32 adapted in the feed position of the slide valve to register with corresponding ports leading to the feed valve supply pipe 29.

A Venturi plug 33 with a tube or passage 34 expanding in diameter towards its ends from a narrow central portion is interposed between passage 25 and pipe 29.

The diaphragm chamber 21 is open to a passage and pipe 35 which may be designated as the feed valve control pipe which leads to the Venturi plug 33 and is connected to the narrow portion of the passage 34 by a passage 36. According to the well known principles of the Venturi tube, as fluid flows rapidly through the restricted central passage 34 of the tube, the pressure in the vicinity of this portion of the passage is reduced. Consequently the pressure in passage 36 is reduced in accordance with the rate of flow of fluid through the Venturi tube 33 to cause the feed valve to be quickly responsive to the flow of air from the feed valve to brake pipe. The diaphragm chamber 22 is open to pipe 27 which leads to the control valve device 4 and has a branch 28 which leads to the timing reservoir 6.

The control valve device 4, which is provided for the purpose of controlling the pressure of the fluid in the brake system upon initially charging and recharging after a reduction in brake pipe pressure, may be in many respects quite similar in construction to that of a simple type of triple valve device. As shown this valve device comprises a casing having a piston chamber 37 connected to the brake pipe 1 through a passage and pipe 38 and a brake pipe branch pipe 39. Contained in chamber 37 is a piston 40 having a stem 46 for effecting the operation of a graduating valve 44 and a slide valve 45, a valve chamber 42 at the opposite side of the piston 40, which chamber 37 is connected by way of pipe 43 to the volume reservoir 5. Also disposed in piston chamber 37 is the usual graduating stem 47, subject to the pressure of a spring 48, which stem is adapted to be engaged by piston 40 when the piston moves toward the left upon a reduction in brake pipe pressure.

*Operation*

Assuming that the brake equipment is uncharged and that the brake valve device 2 is in its release position, as shown in Fig. 1, which, as is usual, is the position to which the brake valve device is first moved in initially charging.

With the system uncharged spring 15 of the feed valve device will hold piston 12 and thereby the slide valve 14 in their innermost position, so that communication between the slide valve chamber 13 and pipe and passage 29 will be cut off. Further with the system uncharged, the spring 23 acting through the medium of the diaphragm 21 to maintain the valve 24 unseated as shown in Fig. 1.

In initially charging the equipment under these conditions, the main reservoir 7 on the locomotive is supplied with fluid under pressure in the usual manner and fluid under pressure from this reservoir flows through a pipe and passage 50 to the slide valve chamber 13 of the feed valve device 3.

Fluid under pressure thus supplied to chamber 13 flows to chamber 11 by way of passage 19, strainer 8, restriction 17 and passage 16 at a restricted rate as controlled by the restriction 17, so that the preponderate pressure in chamber 13 causes the piston 12 and attached slide valve 14 to move to the position in which they are shown in the drawing. In this position the ports 32 in the slide valve 14 register with the supply ports leading to the feed valve supply passage and pipe 29. Fluid under pressure from the main reservoir 7 and the connected feed valve chamber 13 is thus supplied to pipe 29 and from thence flows to the rotary valve chamber 9 of the automatic brake valve device 2, by way of Venturi passage 34 and 36, and passage 25 in the brake valve device.

With the rotary valve 9 of the automatic brake valve device in release position, as shown in Fig. 1 of the drawing, fluid under pressure in chamber 8 of the brake valve device flows through a large unrestricted port 52 and passage 53 to the pipe 39 and therethrough to the brake pipe 1. Fluid under pressure supplied to pipe 39 also flows through the branch pipe and passage 38 to the control valve piston chamber 37.

When the piston chamber 37 is charged with fluid under pressure, the control valve piston 40 and slide valve 45 are moved to their innermost position, as shown in the drawing. In this position a feed groove 55 is uncovered, permitting flow of fluid from the piston chamber 37 and the brake pipe to valve chamber 42 and from thence to the volume reservoir 5 by way of passage and pipe 43. With the main slide valve in this position, an exhaust cavity 56 provided therein connects a passage 57 leading from the pipe 27 with an exhaust passage 58, so that the diaphragm chamber 22 of the feed valve device 3 and connected timing reservoir 6 are vented to the atmosphere.

Since the valve 24 is in its unseated position, fluid under pressure flows from piston chamber 11 to the diaphragm chamber 21 and from this latter chamber flows through passage and pipe 35 to the Venturi passages 34 and 36.

By supplying fluid under pressure through the unobstructed passage of large capacity directly from the feed valve 3 to the brake pipe 1, the brake pipe pressure is rapidly increased to the pressure normally carried in the brake pipe, as determined by the adjustment of the adjusting spring 23 in the feed valve device 3. When the pressure in the brake pipe and in the diaphragm chamber 21 of the feed valve device 3 have been increased to the adjusted pressure, the diaphragm 20 is flexed so as to permit the valve 24 to seat. When fluid pressure in chambers 11 and 13 are substantially equal, the spring 15 acts to move the piston 12 and attached slide valve 14 to their innermost position, where the supply of fluid from the slide valve chamber 13 to the feed valve control pipe 29 is cut off.

When the equipment is fully charged, the handle 10 of the automatic brake valve device is turned to running position, as shown in Fig. 2 of the drawing. In this position the passage 53 is cut off from the rotary valve chamber 8 and is connected through a cavity 60 in the rotary valve to passage 26. With this latter communication established, fluid under pressure flows from the feed valve supply pipe 29 to the brake pipe by way of pipe 30, through a choke 59, passage 26, cavity 60 in the rotary valve 9 and passage 53 and pipe 39 to maintain the pressure in the brake pipe. The flow of fluid under pressure through choke 59 from the feed valve supply pipe to the brake pipe in running position of the brake valve is at the same rate as is at present supplied through the well known "M" type feed valve used in conjunction with the present standard types of locomotive equipment, such as either the No. 6ET, 8ET locomotive brake equipments.

In the usual equipment the return of the automatic brake valve handle from release position to running position when the equipment is being charged is required in order to prevent overcharge of the system.

It may be noted, however, that in the present invention it is not necessary to move the brake valve handle from release position to running position after some predetermined interval of time in order to avoid overcharging of the equipment, but it need only be moved to running position when the equipment is fully charged and the train is running over the road.

Service application

When it is desired to initiate a service application of the brakes, the handle of the automatic brake valve device is turned to service position in which communication between the rotary valve chamber 8 and passage 53 and the brake pipe is cut off and in which position fluid under pressure is released from the brake pipe to the atmosphere at a service rate, to effect an application of the brakes in the usual well known manner. Upon effecting the reduction in the pressure of fluid in the brake pipe, the pressure in branch pipe 39 and piston chamber 37 is consequently reduced and the piston 40 is shifted toward the left, as viewed in the drawing. The first movement of the piston closes off communication through the feed groove 55 and causes movement of the graduating slide valve 44 relative to the main valve 45, so that a service port 62 in the main slide valve is uncovered and so that port 62 connects with a port 63 in the main slide valve. The movement of the piston 40, and consequently the main slide valve 45, continues until these parts are in application position, in which the service port 62 registers with the passage 57, for supplying fluid under pressure from the slide valve chamber 39, and connected volume reservoir 5, to the timing reservoir 6 and diaphragm chamber 22 of the feed valve device 3 to increase the feed valve setting above the regular pressure setting determined by spring 23 only. Which increase in pressure setting is proportional to the reduction in brake pipe pressure.

The flow of fluid under pressure from the volume reservoir 5 and valve chamber 42 to the timing reservoir 6 and diaphragm chamber 22, continues until the pressure in chamber 42 is slightly less than the pressure of fluid in chamber 37, at which time the higher pressure in chamber 37 causes the piston to act to shift the valve 44 to close communication between ports 62 and 63 and thereby cut off further flow of fluid to the reservoir 6 and chamber 22.

Recharging the equipment to release the brakes after an application

When it is desired to recharge the equipment and effect a release of the brakes on a train, the handle 10 of the brake valve device is turned to release position. In this position communication is established between the feed valve control pipe 35, and consequently the diaphragm chamber 21 of the feed valve device 3 and the brake pipe 1 and also between the feed valve supply pipe 29 and the brake pipe 1, as hereinbefore described under initial charging of the equipment.

When the control pipe 35 is connected to the brake pipe 1 a reduction of pressure in diaphragm chamber 21 will result, which reduction permits the regulating spring 23 and the pressure of fluid acting in diaphragm chamber 22 at the opposite side of the diaphragm to unseat valve 24. Fluid under pressure now flows from chamber 11 to chamber 21 causing a reduction in the pressure of fluid in chamber 11 so that the pressure of fluid in chamber 13 causes the piston 12 to move to the position in which it is shown in Fig. 1, shifting the slide valve 14 to its feed position in which fluid under pressure flows from valve chamber 13 to the feed valve supply pipe 29 and therefrom to the branch pipe 39 and consequently the brake pipe 1, as hereinbefore described under initial charging.

Thus fluid under pressure will be discharged from the main reservoir and chamber 13 of the feed valve device to the brake pipe at a pressure in excess of that normally carried in the brake pipe thereby effecting a rapid increase of pressure in the brake pipe which will cause a quick release of brakes.

Fluid under pressure supplied to pipe 39 also flows to pipe and passage 38 leading to the piston chamber 37. The increase of pressure in chamber 37, due to such flow, overcomes the opposing action of the pressure in chamber 42 at the opposite side of the piston 40 and piston 40, graduating valve 44 and slide valve 45 move their innermost as shown in the drawing. In this position communication between port 62 and passage 57 is cut-off and fluid under pressure in the timing reservoir 6 and connected diaphragm chamber 22 is vented at a restricted rate. A choke 64 in atmospheric passage 58 retards the rate of flow of fluid from chamber 22 to the atmosphere, thereby gradually conditioning the feed valve to its normal setting.

With the increase of pressure in brake pipe 1, the pressure in supply pipe 29 and in feed valve control pipe 35 and diaphragm chamber 21 consequently increases. When this pressure in chamber 21 has increased to the setting of the regulating spring 23, the feed valve device operates to cut off the supply of fluid under pressure from the slide valve chamber 13 to the feed valve supply pipe 29.

It will be noted that the pressure in the timing reservoir determines the excess pressure setting of the feed valve device when starting a recharge and that this excess is proportional to the brake application previously made. From this it can be seen that a large quantity of fluid at this excess pressure is available for releasing a full service or emergency brake application without danger of overcharge.

It will also be noted that the setting of the feed valve is gradually returned to its normal value as the brake pipe pressure at the front end of the train is increased and that no excess pressure is available until after a brake application is made. Thus the degree of excess pressure together with the length of time it is available is directly proportional to the quantity of air required to fully recharge the brake pipe to the normal pressure carried therein.

It will now be evident that the release of the brakes, and the recharging of the brake system of either freight or passenger trains of any length is accomplished merely by positioning the brake valve in release position until the system is fully charged to the pressure normally carried therein. When the system is fully charged the brake valve is returned to running position in which position it is carried while running over the road, as is usual.

It will be seen also that an improved locomotive brake equipment has been provided with means whereby the danger of objectional overcharge of the equipment is eliminated.

While one embodiment of the improved locomotive brake equipment has been illustrated and described in detail, it should be understood that the invention is not limited to these details of construction, and that numerous changes and modifications may be made without departing from the scope of the following claims.

Having now described my invention, what I claim as new and desire to secure by Letters Patent is:

1. In a fluid pressure brake system of the type comprising a brake pipe normally charged with fluid under pressure to a certain degree and operative upon a reduction in brake pipe pressure to effect an application of the brakes and upon an increase in brake pipe pressure to effect a release of the brakes, a brake valve device having at least three positions, one for establishing a communication through which a reduction in brake pipe pressure is effected and the other positions for establishing communications through which fluid under pressure is supplied to the brake pipe, fluid pressure responsive means included in said system so constructed and arranged as to control the supply of fluid under pressure to the brake pipe in either of said other positions and adapted to be conditioned upon an application of the brakes to operate to initially supply fluid to the brake pipe at a pressure in excess of said certain degree during a subsequent release of the brakes in either of said other positions, the excess pressure being proportional to the degree of brake pipe reduction previously made, and means responsive to the reduction in brake pipe pressure for supplying the operating fluid under pressure to the fluid pressure responsive means.

2. In a fluid pressure brake system of the type comprising a brake pipe normally charged with fluid under pressure to a certain degree and operative upon a reduction in brake pipe pressure to effect an application of the brakes and upon an increase in brake pipe pressure to effect a release of the brakes, a brake valve device having at least three positions, one for establishing a communication through which a reduction in brake pipe pressure is effected and the other positions for establishing communications through which fluid under pressure is supplied to the brake pipe, means normally operative to charge said brake pipe with fluid under pressure to said certain degree and operative in effecting the release of the brakes to initially supply fluid to the brake pipe at a higher pressure than normally carried in the brake pipe, said means being automatically conditioned in response to a reduction in brake pipe pressure during the application of the brakes to provide the higher pressure and to regulate said higher pressure in accordance with the degree of the brake application.

3. In a fluid pressure brake system, in combination, a brake pipe normally charged with fluid to a chosen pressure, an engineer's brake valve device operative in one position to effect a reduction in brake pipe pressure to apply the brakes and operative in two or more positions to charge the brake pipe to effect a release of the brakes, pressure control means located in the system so as to control the supply of fluid under pressure to the brake pipe by way of the brake valve device in either of said release positions and operative to maintain said brake pipe charged with fluid at said chosen pressure when the brakes are released, and means responsive to reductions in brake pipe pressure for causing said pressure control means to initially supply fluid to said brake pipe at a pressure higher than said chosen pressure and to a degree proportional to the brake pipe reduction previously made.

4. In a fluid pressure brake system, the combination with a source of fluid under pressure, and a brake pipe, of a feed valve device arranged in the system so as to control the supply of fluid under pressure from the source to the brake pipe and adapted to supply fluid from said source to the brake pipe at a chosen pressure less than the pressure of said source, a brake valve device having at least two positions for controlling the flow of fluid from the feed valve device to the brake pipe and having a brake application position for effecting a reduction in brake pipe pressure, means responsive to a reduction in brake pipe pressure for causing said feed valve device to initially supply fluid to the brake pipe at a pressure higher than said chosen pressure and to a degree proportional to the brake pipe reduction previously made.

5. In a fluid pressure brake system, in combination, a brake pipe normally charged with fluid to a chosen pressure, an engineer's brake valve device operative in a brake applying position to reduce the pressure in the brake pipe to apply the brakes and operative to a brake releasing position to charge the brake pipe to release the brakes, means operative to maintain said brake pipe charged with fluid at a given pressure when the brakes are released, means responsive to brake pipe reductions when applying the brakes for conditioning said first mentioned means to operate to initially supply fluid to the brake pipe at higher than said chosen pressure, and means for gradually reconditioning the first mentioned means to its normal setting.

6. In a fluid pressure brake equipment, in combination, a source of fluid under pressure, a brake pipe adapted to be charged with fluid from said source at a predetermined pressure less than that of said source, a brake valve device having at least three positions, one for establishing a communication through which fluid in the brake pipe is reduced to effect an application of the brakes and the others for establishing communications through which fluid under pressure is supplied to the brake pipe to charge the brake pipe to effect a release of the brakes, a supply valve for controlling the supply of fluid from said source to the brake pipe by way of the brake valve device in said other positions, means controlling the supply valve and operative to effect operation thereof to limit the supply to said predetermined pressure, other means subject to brake pipe pressure adapted to operate in conjunction with the first mentioned means for controlling the supply valve to operate to limit the supply of fluid to a pressure higher than said predetermined pressure but at a pressure lower than that of said source, said other means being operative in response to reductions in brake pipe pressure for conditioning the first mentioned means for operation to provide said higher pressure when brake pipe pressure is reduced below said predetermined degree, said higher pressure being proportional to the degree of the previous brake application.

7. In a fluid pressure brake equipment, in combination, a source of fluid under pressure, a brake pipe normally charged with fluid from said source to a pressure less than that of said source, a valve device having a supply valve for controlling the supply of fluid from said source to the brake pipe, a brake valve device having at least three positions, one for reducing brake pipe pressure to effect an application of the brakes and the others for connecting said valve device to the brake pipe to supply fluid under pressure to charge the brake pipe to effect a release of the brakes, means for controlling the supply valve to at one time limit the pressure of fluid supplied to the brake pipe by way of the brake valve device in either of said other positions to that normally carried and other means subject to brake pipe pressure and responsive to reductions in brake pipe pressure for controlling the operation of the first mentioned means to supply fluid to the brake pipe to a pressure higher than said normal pressure, said other means being controlled according to the degree of reduction in brake pipe pressure for determining said higher pressure.

8. In a fluid pressure brake system, in combination, a brake pipe, an engineer's brake valve device operative in one position to effect a reduction in brake pipe pressure to apply the brakes and operative in two or more positions to supply fluid under pressure to charge the brake pipe to effect a release of the brakes, pressure control means adapted to control the supply of fluid under pressure to the brake pipe by way of said brake valve device in either of said release positions and operative for normally maintaining said brake pipe charged to a predetermined pressure, and means responsive to the brake pipe reduction in effecting an application of the brakes and controlled according to the degree of such reduction for causing said pressure control means to supply fluid to charge the brake pipe to a higher pressure than that normally carried.

9. In a fluid pressure brake system in combination, a brake pipe normally charged with fluid at a chosen pressure, a brake valve device operative in an application position to effect a reduction in brake pipe pressure to apply the brake and operative in both a release and a running position to effect a supply of fluid under pressure to charge the brake pipe to release the brakes, supply valve means for controlling, in either said release or said running position, the supply of fluid under pressure to the brake pipe, regulating means normally operative to control the supply valve means to supply fluid under pressure to the brake pipe at said chosen pressure and conditionable to provide for operation of the supply valve means to supply fluid under pressure to the brake pipe at a pressure higher than said chosen pressure, means responsive to a reduction in brake pipe pressure and operative when effecting an application of the brakes to operate upon subsequent movement of the brake valve device to either said release or said running position to condition the regulating means to provide for the supply of fluid under pressure to the brake pipe at said higher pressure and means for cutting off the supply of fluid to the brake pipe at said higher pressure upon the expiry of a certain interval of time.

10. In a fluid pressure brake system, in combination, a brake pipe normally charged with fluid at a chosen pressure, a brake valve device operative in an application position to effect a reduction in brake pipe pressure to apply the brakes and operative in both a release and a running position to effect a supply of fluid under pressure to charge the brake pipe to release the brakes, supply valve means for controlling the supply of fluid under pressure to the brake pipe by way of the brake valve device in either said release or said running positions, regulating means normally operative to control the supply valve means to supply fluid under pressure to the brake pipe at said chosen pressure and conditionable to provide for operation of the supply valve means to supply fluid under pressure to the brake pipe at a pressure higher than said chosen pressure, means responsive to a reduction in brake pipe pressure, in effecting an application of the brakes, to condition the regulating means to function, upon subsequent movement of the brake valve device to either said release or said running position, to control the operation of the supply valve to provide for the supply of fluid under pressure to the brake pipe at said higher pressure, and means operative in accordance with the degree of the previous brake application for cutting off the supply of fluid to the brake pipe at said higher pressure.

11. In a fluid pressure brake system, in combination, a brake pipe normally charged with fluid at a chosen pressure, a brake valve device operative in an application position to effect a reduction in brake pipe pressure to apply the brakes and operative in both a release and a running position to effect a supply of fluid under pressure to charge the brake pipe to release the brakes, supply valve means for controlling the supply of fluid under pressure to the brake pipe by way of the brake valve device in either said release or said running position, regulating means normally operative to control the supply valve means to supply fluid under pressure to the brake pipe at said chosen pressure and conditionable to provide for operation of the supply valve means to supply fluid under pressure to the brake pipe at a pressure higher than said chosen pressure, means responsive to a reduction in brake pipe pressure, in effecting an application of the brakes to condition the regulating means to function, upon subsequent movement of the brake valve device to either said release or said running position to provide for the supply of fluid under pressure to the brake pipe at said higher pressure, and means operative in accordance with the degree of brake pipe reduction made during an application of the brakes for cutting off the supply of fluid to the brake pipe at said higher pressure.

12. In a fluid pressure brake system in combination, a brake pipe normally charged with fluid at a chosen pressure, a brake valve device operative in an application position to effect a reduction in brake pipe pressure to apply the brakes and operative in both a release and a running position to effect a supply of fluid under pressure to charge the brake pipe to release the brakes, supply valve means for controlling the supply of fluid under pressure to the brake pipe, regulating means comprising a chamber normally vented to the atmosphere, said regulating means being operative when said chamber is at atmospheric pressure to control the supply valve means to supply fluid under pressure to the brake pipe at said chosen pressure and conditionable upon the supply of fluid under pressure to said chamber to provide for operation of the supply valve means to supply fluid under pressure to the brake pipe at a pressure higher than said chosen pressure, means responsive to a reduction in brake pipe pressure in effecting an application of the brakes to control a supply of fluid under pressure to said chamber and thereby effect operation of the regulating means upon subsequent movement of the brake valve device to either said release or said running position to condition the regulating means to provide for the supply of fluid under pressure to the brake pipe at said higher pressure and conditioned in effecting the release of the brakes to vent fluid under pressure from said chamber, and means for controlling the rate at which fluid under pressure is vented from said chamber to thereby effect the operation of said regulating means to provide for the cutting off of the supply of fluid under pressure to the brake pipe at said higher pressure.

13. In a fluid pressure brake system, in combination, a brake pipe normally charged with fluid at a chosen pressure, a brake valve device operative in an application position to effect a reduction in brake pipe pressure to apply the brakes and operative in both a release and a running position to effect a supply of fluid under pressure to charge the brake pipe to release the brakes, supply valve means for controlling the supply of fluid under pressure to the brake pipe by way of the brake valve device either in said release or said running position, regulating means normally operative to control the supply valve means to supply fluid under pressure to the brake pipe at said chosen pressure and conditionable to provide for operation of the supply valve means to supply fluid under pressure to the brake pipe at a pressure higher than said chosen pressure, means responsive to a reduction in brake pipe pressure in effecting an application of the brakes to condition the regulating means to function, upon subsequent movement of the brake valve device to either said release or said running position to provide for the supply of fluid under pressure to the brake pipe at said higher pressure, said higher pressure being controlled in accordance with the degree of brake pipe reduction made during an application of the brakes, and means for cutting off a certain time after it becomes effective the supply of fluid to the brake pipe at said higher pressure.

14. In a fluid pressure brake system, in combination, a brake pipe normally charged with fluid at a chosen pressure, a brake valve device operative in an application position to effect a reduction in brake pipe pressure to apply the brakes and operative in both a release and a running position to effect a supply of fluid under pressure to charge the brake pipe to release the brakes, supply valve means for controlling by way of the brake valve device in either said release or said running position the supply of fluid under pressure to the brake pipe, regulating means normally operative to control the supply valve means to supply fluid under pressure to the brake pipe at said chosen pressure and conditionable to provide for operation of the supply valve means to supply fluid under pressure to the brake pipe at a pressure higher than said chosen pressure, means responsive to a reduction in brake pipe pressure, in effecting an application of the brakes to condition the regulating means to function, upon subsequent movement of the brake valve device to either said release or said running position to provide for the supply of fluid under pressure to the brake pipe at said higher pressure, and timing means operative incident to subsequent movement of said brake valve device to release or running position for cutting off a certain time after it becomes effective the supply of fluid to the brake pipe at said higher pressure, said higher pressure being proportional to the degree of the previous brake application.

15. In a fluid pressure brake system, in combination, a brake pipe normally charged with fluid to a chosen pressure, an engineer's brake valve device operative in one position to effect a reduction in brake pipe pressure to apply the brakes and operative in another position to charge the brake pipe to effect a release of the brakes, pressure control means adapted to control the supply of fluid under pressure to the brake pipe by way of the brake valve device in said release position, said pressure control means comprising a supply portion and a regulating portion, said regulating portion comprising a chamber normally vented to the atmosphere to condition the supply portion for operation to maintain said brake pipe charged with fluid at said chosen pressure while the brakes are released, and means responsive to reductions in brake pipe pressure when effecting an application of the brakes to supply fluid under pressure to said chamber for causing said pressure regulating portion to condition the supply portion for operation upon subsequent release of the brakes to initially supply fluid to said brake pipe at a pressure higher than said chosen pressure and to a degree proportional to the brake pipe reduction previously made.

16. In a fluid pressure brake system, in combination, a brake pipe normally charged with fluid at a chosen pressure, a brake valve device operative in an application position to effect a reduction in brake pipe pressure to apply the brakes and operative in both a release and a running position to effect a supply of fluid under pressure to charge the brake pipe to release the brakes, supply valve means comprising a piston and a valve operated by said piston for controlling by way of the brake valve device either in said release or said running position the supply of fluid under pressure to the brake pipe, regulating means comprising a movable abutment subject on one side to brake pipe pressure and on the other side to the pressure of a spring for normally controlling the operation of said piston and thereby said valve to supply fluid under pressure to the brake pipe to said chosen pressure, said abutment being conditionable to provide for operation of the piston and supply valve to supply fluid under pressure to the brake pipe by way of the brake valve device to a pressure higher than said chosen pressure, means responsive to a reduction in brake pipe pressure when effecting an application of the brakes to supply fluid under pressure to the spring side of said abutment to condition said piston and thereby said valve for operation to supply fluid under pressure to the brake pipe to said higher pressure, means operative upon the subsequent movement of the brake valve device to either its release or its running position for effecting the operation of said piston and supply valve, the means responsive to reductions in brake pipe pressure being operative upon a predetermined increase in brake pipe pressure when the brake valve device is in either its release or running position for venting fluid under pressure from the spring side of said abutment to effect the operation of said piston and supply valve to cut off the flow of fluid to the brake pipe and to condition the abutment for controlling the operation of said piston and supply valve to maintain brake pipe pressure at said chosen pressure.

17. In a fluid pressure brake system, in combination, a brake pipe normally charged with fluid at a chosen pressure, a brake valve device operative in an application position to effect a reduction in brake pipe pressure to apply the brakes and operative in both a release and a running position to effect a supply of fluid under pressure to charge the brake pipe to release the brakes, a supply valve for controlling by way of the brake valve device in either said release or said running position the supply of fluid under pressure to the brake pipe, regulating means comprising a movable abutment subject to brake pipe pressure and a spring and normally operative upon a reduction in brake pipe pressure to control the supply valve to supply fluid under pressure to the brake pipe for maintaining the fluid in the brake pipe at said chosen pressure, said abutment being conditionable to provide for operation of the supply valve to supply fluid under pressure to the brake pipe at a pressure higher than said chosen pressure, a reservoir normally charged with fluid under pressure at said chosen pressure, means subject to brake pipe pressure and the pressure of fluid in said reservoir and responsive to a reduction in brake pipe pressure in effecting an application of the brakes to condition the abutment to function, upon subsequent movement of the brake valve device to either said release or said running position to control the operation of the supply valve to provide for the supply of fluid under pressure to the brake pipe at said higher pressure, said means being operative upon an increase in brake pipe pressure to cause said regulating means to function to cause said supply valve to be operated to a position to cut off the supply of fluid to the brake pipe at said higher pressure, and means for delaying the operation of said regulating means.

18. In a fluid pressure brake system, in combination, a brake pipe normally charged with fluid at a chosen pressure, a brake valve device operative in an application position to effect a reduction in brake pipe pressure to apply the brakes and operative in both a release and a running position to effect a supply of fluid under pressure to charge the brake pipe to release the brakes, a supply valve for controlling by way of the brake valve device in either said release or sait running position the supply of fluid under pressure to the brake pipe, regulating means normally operative to control the supply valve to supply fluid under pressure to the brake pipe at said chosen pressure and conditionable to provide for operation of the supply valve to supply fluid under pressure to the brake pipe at a pressure higher than said chosen pressure, one reservoir normally charged with fluid under pressure from the brake pipe, another reservoir normally vented to the atmosphere, means subject to brake pipe pressure and the pressure in said one reservoir and responsive to a reduction in brake pipe pressure, in effecting an application of the brakes to supply fluid under pressure from said one reservoir to said other reservoir to condition the regulating means to function, upon subsequent movement of the brake valve device to either said release or said running position to control the operation of the supply valve to provide for the supply of fluid under pressure to the brake pipe at said higher pressure, said means being responsive upon an increase in brake pipe pressure to cut off the flow of fluid under pressure from said one reservoir to said other reservoir and to vent fluid under pressure from said other reservoir to cause said regulatng means to function to cause said supply valve to be operated to a position to cut off the supply of fluid to the brake pipe at said higher pressure, and means associated with the first mentioned means for controlling the venting of fluid under pressure from said other reservoir to delay the operation of said regulating means.

19. In a fluid pressure brake system, in combination, a brake pipe normally charged with fluid to a chosen pressure, an engineer's brake valve device operative in one or more application positions to effect a reduction in brake pipe pressure to apply the brakes and operative in at least two release positions to charge the brake pipe to effect a release of the brakes, pressure control means adapted in either of said release positions of the brake valve device for controlling the supply of fluid under pressure to the brake pipe, said means comprising a supply portion and a regulating portion, said regulating portion comprising a chamber normally vented to the atmosphere to condition the supply portion for operation to maintain said brake pipe charged with fluid at said chosen pressure while the brakes are released, and means responsive to reductions in brake pipe pressure when effecting an application of the brakes to supply fluid under pressure to said chamber for causing said pressure regulating portion to condition the supply portion for operation upon a subsequent release of the brakes to initially supply fluid to said brake pipe at a pressure higher than said chosen pressure, said means being operative upon a predetermined increase in brake pipe pressure in releasing the brakes for venting fluid under pressure from said chamber to condition the regulating portion for operation of the supply portion to cut off the flow of fluid to the brake pipe at said higher pressure and to gradually recondition the regulating portion to control the supply portion for operation to maintain the brake pipe pressure at said chosen pressure.

20. In a fluid brake system, in combination, a brake pipe normally charged with fluid to a chosen pressure, an engineer's brake valve device operative in one or more application positions to effect a reduction in brake pipe pressure to apply the brakes and operative in at least two release positions to charge the brake pipe to effect a release of the brakes, pressure control means adapted in any release position of the brake valve device for controlling the supply of fluid under pressure to the brake pipe, said means comprising a supply portion and a regulating portion, said regulating portion comprising a chamber normally vented to the atmosphere to condition the supply portion for operation to maintain said brake pipe charged with fluid at said chosen pressure while the brakes are released, and means responsive to reductions in brake pipe pressure when effecting an application of the brakes to supply fluid under pressure to said chamber for causing said pressure regulating portion to condition the supply portion for operation upon a subsequent release of the brakes to initially supply fluid to said brake pipe at a pressure higher than said chosen pressure, said means being operative upon a predetermined increase in brake pipe pressure in releasing the brakes for venting fluid under pressure from said chamber to condition the regulating portion for operation of the supply portion to cut off the flow of fluid to the brake pipe at said higher pressure, and means for retarding the rate of venting of fluid under pressure from said chamber to delay the operation of said regulating portion to control the supply portion to cut off the supply of fluid under pressure to the brake pipe.

21. In a fluid pressure brake system, in combination, a brake pipe normally charged with fluid to a chosen pressure, an engineer's brake valve device operative in a brake applying position to reduce the pressure in the brake pipe to apply the brakes and operative to a brake releasing position to charge the brake pipe to release the brakes, means operative to maintain said brake pipe charged with fluid at a given pressure when the brakes are released, means responsive to brake pipe reductions when applying the brakes for conditioning said first mentioned means to operate to initially supply fluid to the brake pipe at higher than said chosen pressure, and other means associated with the second mentioned means for controlling operation of the first mentioned means to cut off the supply of fluid to the brake pipe at said higher pressure upon the expiring of a certain interval of time.

22. In a fluid brake system, in combination, a brake pipe normally charged with fluid to a chosen pressure, an engineer's brake valve device operative in a brake applying position to reduce the pressure in the brake pipe to apply the brakes and operative to a brake releasing position to charge the brake pipe to release the brakes, means operative to maintain said brake pipe charged with fluid at a given pressure when the brakes are released, and means responsive to brake pipe reductions when applying the brakes for conditioning said first mentioned means to operate to initially supply fluid to the brake pipe at higher than said chosen pressure, said second mentioned means conditioning the first mentioned means according to the degree of reduction in brake pipe pressure for determining said higher pressure.

23. In a fluid pressure brake system, in combination, a brake pipe normally charged with fluid to a chosen pressure, an engineer's brake valve device operative in a brake applying position to reduce the pressure in the brake pipe to apply the brakes and operative to a brake releasing position to charge the brake pipe to release the brakes, a feed valve device adapted to control the supply of fluid under pressure to the brake pipe, said feed valve device comprising a valve operative at one time to maintain said brake pipe charged with fluid at a given pressure and operative at another time to charge the brake pipe with fluid to a pressure higher than said chosen pressure, means for conditioning said valve, and fluid pressure responsive means for controlling the first mentioned means, said fluid pressure responsive means being normally operative to control said means to condition said valve to operate to maintain said brake pipe charged with fluid at said given pressure and operative upon a reduction in brake pipe pressure of a predetermined degree when effecting an application of the brakes for controlling said means to condition said valve to operate upon a subsequent release of the brakes to charge the brake pipe with fluid to a pressure higher than said chosen pressure, and means associated with the fluid pressure responsive means for controlling the first mentioned means to condition said valve to cut off the flow of fluid to the brake pipe at said higher pressure a certain time after it becomes effective.

24. In a fluid pressure brake system, in combination, a main reservoir normally charged with fluid under pressure, a brake pipe adapted to be normally charged with fluid under pressure at a reduced pressure from said main reservoir, a brake valve device operative in one position to effect a reduction in brake pipe pressure to apply the brakes and operative in another position to charge the brake pipe to effect a release of the brakes, a feed valve device interposed between said main reservoir and said brake valve device and adapted to control the flow of fluid under pressure from the main reservoir to said brake valve device and having a valve operative upon a reduction in pressure in a chamber to supply fluid under pressure from the main reservoir to the brake pipe when the brake valve device is in said other position, means for supplying fluid under pressure to said chamber, said chamber being connected through a communication to said brake pipe for providing an increase in pressure in said chamber with that in the brake pipe when said brake valve device is in said other position, control means responsive to a predetermined increase in pressure in said chamber to operate the valve means to cut off the supply of fluid under pressure to the brake pipe at the pressure normally carried in the brake pipe, and fluid pressure responsive means operative upon a reduction in brake pipe pressure when said brake valve device is in said one position for loading said control means, said control means when loaded being responsive to a pressure in said chamber higher than said predetermined pressure to cut off the supply of fluid under pressure to the brake pipe at a pressure exceeding the pressure normally carried in the brake pipe, and means included in the fluid pressure responsive means for gradually unloading the control means.

ANDREW T. GORMAN.